United States Patent
Shoji

(10) Patent No.: US 7,222,535 B2
(45) Date of Patent: May 29, 2007

(54) ACCELERATION SENSOR AND MAGNETIC DISK DRIVE APPARATUS

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/214,746

(22) Filed: Aug. 31, 2005

(65) Prior Publication Data

US 2006/0101911 A1    May 18, 2006

(30) Foreign Application Priority Data

Nov. 18, 2004    (JP)    ............................. 2004-334396

(51) Int. Cl.
*G01P 15/11*    (2006.01)
(52) U.S. Cl. .................................. 73/514.31
(58) Field of Classification Search ............. 73/514.31, 73/514.16, 514.29, 514.01, 514.35
See application file for complete search history.

(56) References Cited

U.S. PATENT DOCUMENTS

| | | | |
|---|---|---|---|
| 4,967,598 A * | 11/1990 | Wakatsuki et al. ........ | 73/514.12 |
| 5,747,991 A | 5/1998 | Ito et al. | |
| 6,121,770 A * | 9/2000 | Sudo ........................... | 324/244 |
| 6,131,457 A * | 10/2000 | Sato .......................... | 73/514.31 |
| 6,246,552 B1 * | 6/2001 | Soeno et al. ............. | 360/294.4 |
| 6,507,187 B1 | 1/2003 | Olivas et al. | |
| 6,556,007 B1 * | 4/2003 | Abe et al. ................... | 324/252 |
| 6,789,425 B2 * | 9/2004 | Akieda et al. ........... | 73/514.31 |
| 2006/0101911 A1 | 5/2006 | Shoji | |

FOREIGN PATENT DOCUMENTS

| | | |
|---|---|---|
| JP | 2-81471 | 6/1990 |
| JP | 2-248867 | 10/1990 |
| JP | 11-316134 | 11/1999 |
| JP | 11-352143 | 12/1999 |
| JP | 2003-215145 | 7/2003 |
| WO | WO 00/10022 | 2/2000 |

OTHER PUBLICATIONS

U.S. Appl. No. 11/482,796, filed Jul. 10, 2006, Shoji.
U.S. Appl. No. 11/453,090, filed Jun. 15, 2006, Shoji.
U.S. Appl. No. 11/483,099, filed Jul. 10, 2006, Shoji.
U.S. Appl. No. 11/414,301, filed May 1, 2006, Shoji.
U.S. Appl. No. 11/549,820, filed Oct. 16, 2006, Shoji.
U.S. Appl. No. 11/549,768, filed Oct. 16, 2006, Shoji, et al.

* cited by examiner

*Primary Examiner*—Helen Kwok
(74) *Attorney, Agent, or Firm*—Oblon, Spivak, McClelland, Maier & Neustadt, P.C.

(57) ABSTRACT

An acceleration sensor includes a housing member, a spring member attached to the housing member, the spring member having freedom in at least one direction of acceleration to be detected, a weight and magnetic field generation member fixed to the spring member, and at least one magnetic field detection sensor attached to the housing member to face the weight and magnetic field generation member. The at least one magnetic field detection sensor is provided with at least one multi-layered MR element including a magnetization fixed layer and a magnetization free layer. A direction of magnetic field applied to the at least one multi-layered MR element from the weight and magnetic field generation member is perpendicular to a lamination plane of the at least one multi-layered MR element when no acceleration is applied.

17 Claims, 7 Drawing Sheets

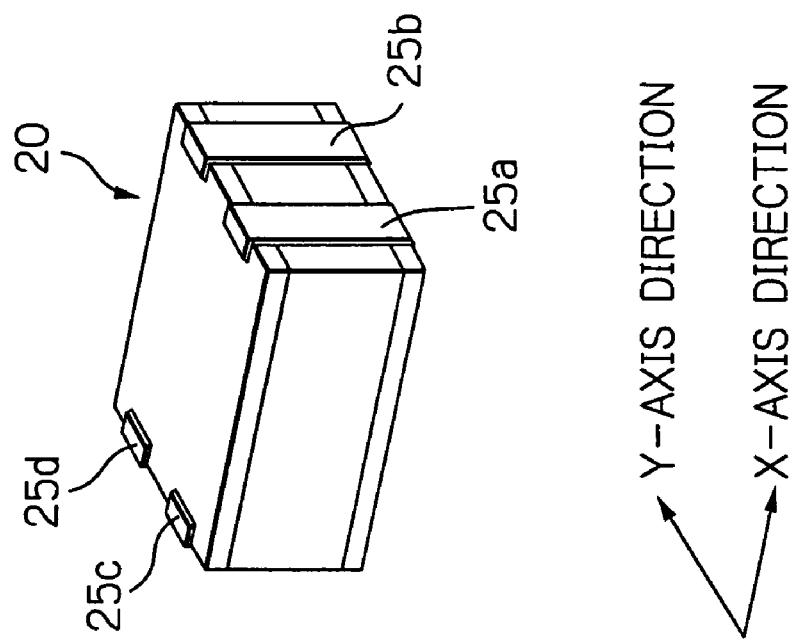
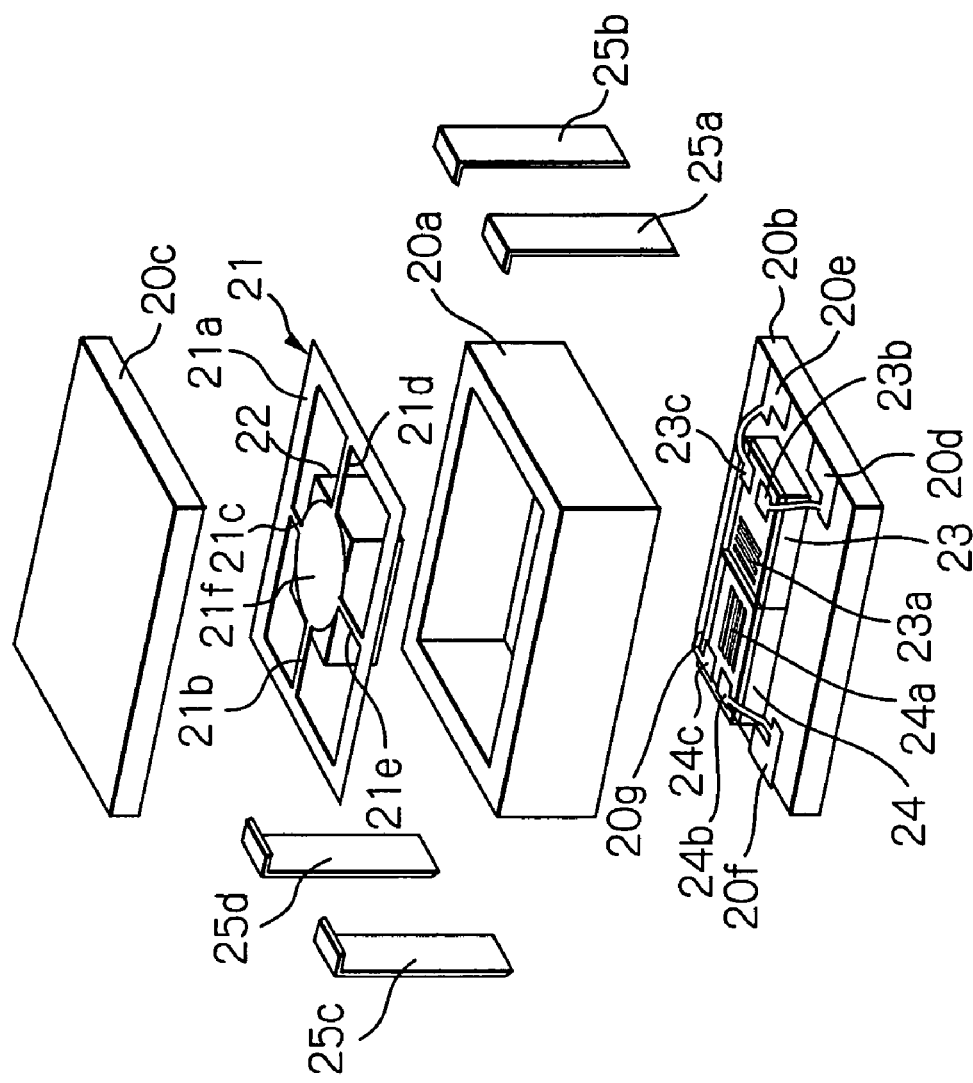

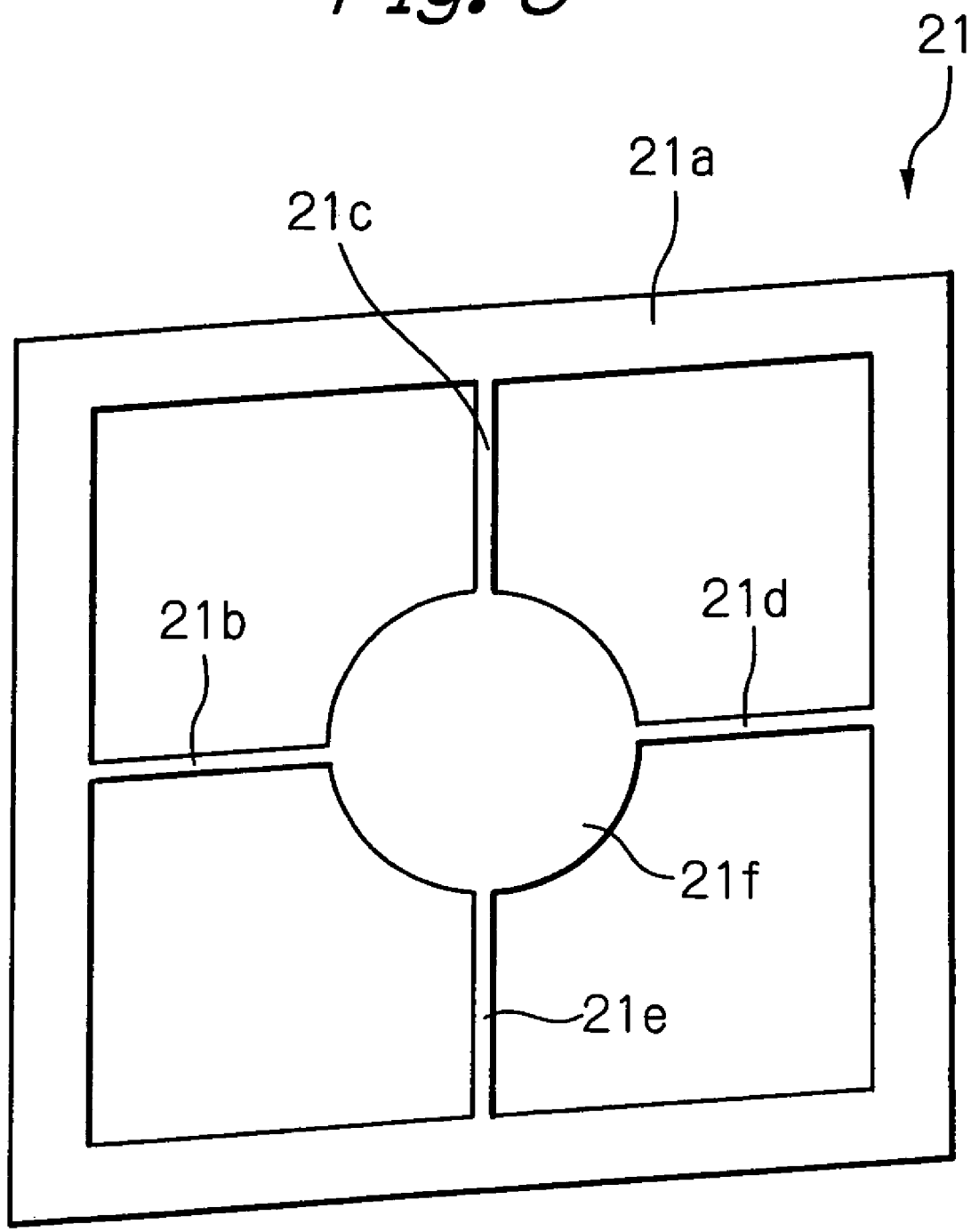

ACCELERATION SENSOR AND MAGNETIC DISK DRIVE APPARATUS

PRIORITY CLAIM

This application claims priority from Japanese patent application No. 2004-334396, filed on Nov. 18, 2004, which is incorporated herein by reference.

BACKGROUND OF THE INVENTION

1. Field of the Invention

The present invention relates to an acceleration sensor with at least one magnetoresistive effect (MR) element and to a magnetic disk drive apparatus with the acceleration sensor.

2. Description of the Related Art

There are magnetic disk drive apparatuses or hard disk drive (HDD) apparatuses assembled in mobile equipments such as for example walkabout personal computers, mobile phones and other mobile gears, provided with shock sensors. The shock sensor generates a signal for immediately interrupting write current when a drop impact is applied to the HDD apparatus so as to avoid corruption of data written in a magnetic recording medium or a hard disk.

The shock sensor is used to merely detect whether a certain impact is applied or not. Therefore, corruption of the written data due to the drop impact can be prevented to some extent, but it is impossible to prevent a collision of a magnetic head with the hard disk surface due to the drop impact and thus damage of the hard disk and breakage of the magnetic head may be induced.

In order to reliably prevent both corruption of data and damages of the magnetic head and the hard disk, it is necessary to detect the instant at which the HDD apparatus falls before occurrence of drop impact and to retract the magnetic head from the hard disk surface. Such instant of the falling can be detected from a change in the acceleration of gravity.

Japanese patent publication No. 02-248867A discloses a piezo-electric type acceleration sensor for detecting a small change in the acceleration of gravity from a change in stress of springs. This sensor has springs in dual tuning fork vibrators, a weight supported by the springs, and piezo-electric elements attached on the springs to detect the change in stress applied to the springs from the weight.

U.S. Pat. No. 5,747,991 discloses an electrostatic capacitance type acceleration sensor for detecting a small change in the acceleration of gravity from a displacement of a weight. This sensor has a movable electrode and a static electrode faced to each other to detect a change in electrostatic capacitance from a change in distance between the movable and static electrodes due to the acceleration.

Such known piezo-electric type acceleration sensor or electrostatic capacitance type acceleration sensor needs to have electrodes for extracting detection signals there from on the spring or the weight attached to the spring and also lead lines electrically connected to the electrodes. Thus, the structure of the sensor becomes complicated due to the lead lines connected to the electrodes. Also, when the spring and weight are miniaturized, wiring process of such lead lines becomes extremely difficult. Further, the lead lines formed on the miniaturized spring or weight may induce breakage of the spring when an excessive value of impact is applied, and prevent movement of the spring to interface with the improvement in sensitivity of the sensor. This tendency becomes more pronounced as the acceleration sensor becomes smaller.

U.S. Pat. No. 6,131,457 discloses an acceleration sensor that may solve the above-mentioned problems in the conventional piezo-electric type acceleration sensor and electrostatic capacitance type acceleration sensor. This acceleration sensor has a magnetic body including a mass point, mounted to a vibrator having three-dimensional freedom and an axis in line with a Z-axis, and four or more detector MR elements positioned on an X-axis and a Y-axis with their centers located along a perimeter of a concentric circle around the origin point of the orthogonal coordinate axes. The sensor is thus capable of detecting each of acceleration in the direction of X-axis through a relative difference in output voltage between the two detector elements on the X-axis due to a vibration of the magnetic field, acceleration in the direction of Y-axis through a relative difference in output voltage between the two detector elements on the Y-axis due to a vibration of the magnetic field, and acceleration in the direction of Z-axis through a sum total of the output voltages of all the detector elements.

According to the acceleration sensor disclosed in U.S. Pat. No. 6,131,457, as it is not necessary to form electrodes on the spring nor the weight, the structure of the sensor becomes simple. However, because an anisotropic MR (AMR) element with a single layer structure of an MR material is used as for each magnetic field detector element, two or more detector elements are necessary for detecting acceleration in a direction along a single axis. Thus, this acceleration sensor requires the great number of detector elements causing the miniaturization of the sensor itself to become extremely difficult. Also, wiring of the many detector elements induces complicated structure of the sensor. Furthermore, using of the AMR elements causes lower sensitivity of the magnetic field, so that it is difficult to provide a highly sensitive acceleration sensor.

SUMMARY OF THE INVENTION

It is therefore an object of the present invention to provide an acceleration sensor with an extremely simple structure and with an extremely miniaturized size, and to provide a magnetic disk drive apparatus with the acceleration sensor.

Another object of the present invention is to provide an acceleration sensor whereby highly sensitive acceleration detection can be expected even though having an extremely simple structure, and to provide a magnetic disk drive apparatus with the acceleration sensor.

According to the present invention, an acceleration sensor includes a housing member, a spring member attached to the housing member, the spring member having freedom in at least one direction of acceleration to be detected, a weight and magnetic field generation member fixed to the spring member, and at least one magnetic field detection sensor attached to the housing member to face the weight and magnetic field generation member. The at least one magnetic field detection sensor is provided with at least one multi-layered MR element including a magnetization fixed layer and a magnetization free layer. A direction of magnetic field applied to the at least one multi-layered MR element from the weight and magnetic field generation member is perpendicular to a lamination plane of the at least one multi-layered MR element when no acceleration is applied.

A bias magnetic field is applied to the lamination plane of the multi-layered MR element from the weight and magnetic field generation member that is fixed to the spring member.

Then, inclination of the weight and magnetic field generation member produced by a balance between a rotation moment due to the applied acceleration and a repulsion due to mainly twisting of the spring member is high sensitively detected as magnetization vector strength in the direction of the magnetization free layer. Because the magnetization vector is detected by the magnetic field detection sensor provided with at least one multi-layered MR element including a magnetization fixed layer and a magnetization free layer, such as for example a giant magnetoresistive effect (GMR) or a tunnel magnetoresistive effect (TMR) element, the amount of and the positive and negative of acceleration in each direction to be detected can be sensed by each magnetic field detection sensor. Therefore, the number of the magnetic field detection sensor can be decreased and also the structure of each magnetic field detection sensor can be extremely simplified resulting the total size of the acceleration sensor to extremely miniaturize. Furthermore, because the GMR element or TMR element is quite sensitive in magnetic field change, highly sensitive acceleration detection can be expected.

Furthermore, because it is not necessary to form electrodes on the spring member and the weight and magnetic field generation member, the wiring structure can be simplified. Also, since the bias magnetic field is applied to the magnetic field detection sensor from the weight and magnetic field generation member, this acceleration sensor is insensitive to possible external electrical field and magnetic field applied thereto. In addition, because of a low impedance, the acceleration sensor according to the present invention is relatively unaffected by external disturbance when compared with the piezo-electric type acceleration sensor and the electrostatic capacitance type acceleration sensor.

It is preferred that the spring member has freedom in rotation around at least two axes.

It is also preferred that the spring member includes at least two support arm sections capable of twisting and a movable section supported by the at least two support arm sections. The weight and magnetic field generation member is fixed to the movable section.

In this case, it is more preferred that the at least two support arm sections of the spring member includes two support arms running along one axis, and that one ends of the two support arms are fixed to the housing member and the other ends of the two support arms are coupled to the movable section. It is also preferred that the at least two support arm sections of the spring member includes four support arms running along two axes perpendicular to each other, and that one ends of the four support arms are fixed to the housing member and the other ends of the four support arms are coupled to the movable section.

It is preferred that the spring member is arranged in parallel to or perpendicular to the lamination plane of the at least one multi-layered MR element.

It is preferred that the weight and magnetic field generation member is fixed to one surface of the spring member so as to convert acceleration applied thereto into a rotation moment.

It is also preferred that the weight and magnetic field generation member is a permanent magnet.

It is further preferred that the at least one magnetic field detection sensor is a single magnetic field detection sensor, and that the single magnetic field detection sensor includes at least one multi-layered MR element magnetized in a direction parallel to the direction of acceleration to be detected.

It is still further preferred that the at least one magnetic field detection sensor is a plurality of magnetic field detection sensors, and that each of the plurality of magnetic field detection sensors includes at least one multi-layered MR element magnetized in a direction parallel to the direction of acceleration to be detected. In this case, preferably, the multi-layered MR elements in the respective magnetic field detection sensors are magnetized in opposite directions parallel to the direction of acceleration to be detected. Also, preferably, the plurality of magnetic field detection sensors are two magnetic field detection sensors, and the multi-layered MR elements in the two magnetic field detection sensors are magnetized in two directions perpendicular to each other, respectively.

It is preferred that each magnetic field detection sensor includes a single multi-layered MR element that has a linear section running along a direction perpendicular to a magnetization direction in the lamination plane.

It is also preferred that each magnetic field detection sensor includes a plurality of multi-layered MR elements each having a linear section running along a direction perpendicular to a magnetization direction in the lamination plane, and that the plurality of multi-layered MR elements are connected with each other in series.

It is preferred that each multi-layered MR element is a GMR element.

According to the present invention, a magnetic disk drive apparatus may include the aforementioned acceleration sensor.

Further objects and advantages of the present invention will be apparent from the following description of the preferred embodiments of the invention as illustrated in the accompanying drawings.

BRIEF DESCRIPTION OF THE DRAWINGS

FIGS. 2a and 2b are an exploded oblique view and an oblique view schematically illustrating a whole structure of a preferred embodiment of an acceleration sensor according to the present invention;

FIG. 3 is an oblique view illustrating a detail structure of a spring member in the embodiment of FIG. 2;

DESCRIPTION OF THE PREFERRED EMBODIMENTS

Figure 1:
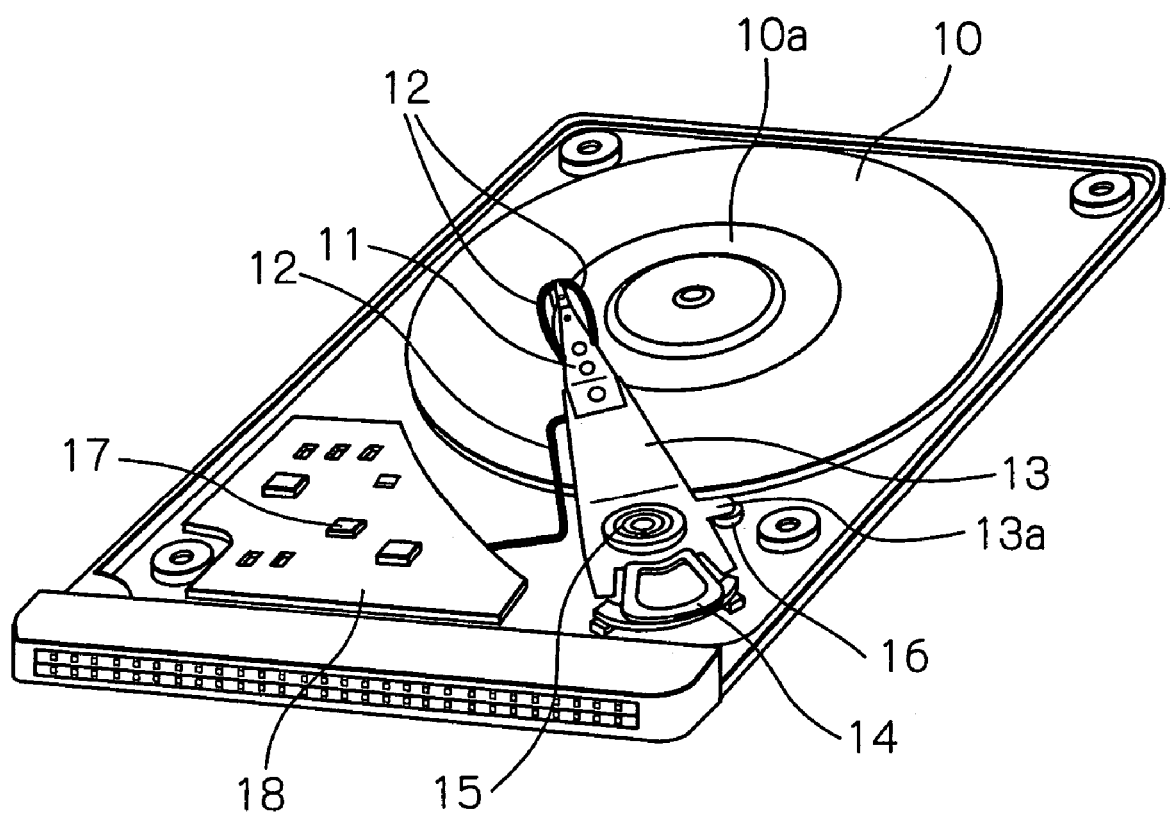
FIG. 1 is an oblique view schematically illustrating a whole structure of an example of a magnetic disk drive apparatus with an acceleration sensor assembled therein.

FIG. 1 schematically illustrates a whole structure of an example of a magnetic disk drive apparatus with an acceleration sensor assembled therein. This magnetic disk drive apparatus is a micro HDD apparatus using at least one magnetic disk of for example 2.5 inches, 1.8 inches, 1.3 inches or 1.0 or less inches. Such micro HDD apparatus may be an HDD apparatus assembled in mobile equipment such as for example a walkabout personal computer, a mobile phone, a digital audio player or other mobile gear, or an HDD apparatus used itself as a mobile storage or a removable HDD.

In the figure that indicates uncovered state of the magnetic disk drive apparatus, reference numeral 10 denotes a magnetic disk rotated by a spindle motor in operation, 10a denotes a retracted zone with no written data into which a magnetic head is moved upon detection of drop, 11 denotes a head gimbal assembly (HGA) provided with the magnetic head that faces to the magnetic disk 10 in operation, at its top end section, 12 denotes a flexible printed circuit (FPC) that is a lead conductor member electrically connected to the magnetic head, 13 denotes a support arm for supporting the HGA 11, 14 denotes a voice coil motor (VCM) that is an actuator for positioning the magnetic head by pivoting the support arm 13 about an axis 15, 16 denotes a ramp on which a tub 13a of the support arm 13 is climbed to lift the magnetic disk away from the magnetic disk surface upon detection of drop, and 17 denotes an acceleration sensor mounted on a circuit board 18, respectively.

FIGS. 2a and 2b schematically illustrate a whole structure of a preferred embodiment of an acceleration sensor according to the present invention, and FIG. 3 illustrates a detail structure of a spring member in this embodiment.

As shown in FIGS. 2a and 2b, the acceleration sensor in this embodiment is used for detecting accelerations in both X-axis direction and Y-axis direction and has a spring member 21, a permanent magnet 22 used as a magnetic field source and also as a weight, and two magnetic field detection sensor chips 23 and 24, accommodated in a housing member 20.

The housing member 20 has a main body 20a with a rectangular barrel shape, a base 20b with a plane shape and a cover 20c with a plane shape. Both opening of the main body 20a are covered by the base 20b and the cover 20c to seal the housing member 20.

The sensor chip 23 for detecting acceleration in the X-axis direction and the sensor chip 24 for detecting acceleration in the Y-axis direction are mounted on the base 20b. On the base 20b, also, connection pads 20d and 20e and connection pads 20f and 20g wire-bonded respectively to terminal electrodes 23b and 23c of the sensor chip 23 and to terminal electrodes 24b and 24c of the sensor chip 24.

These connection pads 20d, 20e, 20f and 20g are electrically connected respectively to external terminals 25a, 25b, 25c and 25d formed on the outer surfaces of the housing member 20.

In the sensor chip 23 for detecting acceleration in the X-axis direction, a plurality of spin valve GMR elements 23a are formed in parallel with each other. Each spin valve GMR element 23a has a linear section running along a direction (Y-axis direction) perpendicular to the X-axis. These spin valve GMR elements 23a are connected in series with each other and both ends of the serially connected elements are electrically connected to the terminal electrodes 23b and 23c, respectively.

Each spin valve GMR element 23a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the sensor chip 23 for detecting acceleration in the X-axis direction is fixed in the X-axis direction.

In the sensor chip 24 for detecting acceleration in the Y-axis direction, a plurality of spin valve GMR elements 24a are formed in parallel with each other. Each spin valve GMR element 24a has a linear section running along a direction (X-axis direction) perpendicular to the Y-axis. These spin valve GMR elements 24a are connected in series with each other and both ends of the serially connected elements are electrically connected to the terminal electrodes 24b and 24c, respectively.

Each spin valve GMR element 24a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the sensor chip 24 for detecting acceleration in the Y-axis direction is fixed in the Y-axis direction.

In this embodiment, the sensor chips 23 and 24 have plurality of spin valve GMR elements 23a and 24a, respectively. However, in modifications, each sensor chip may have a single spin valve GMR element. In the latter case, each spin valve GMR element may be formed in a serpentine pattern with a plurality of linear sections running along the Y-axis or X-axis direction.

The spring member 21 is formed from a thin-film magnetic plate made of for example NiFe, Ni or else, from a thin plate made of for example stainless steel, or from a thin resin plate made of for example polyimide, to have a shape shown in FIG. 3. More concretely, the spring member 21 is formed in a shape with a rectangular outer frame section 21a sandwiched and fixed between the main body 20a and the cover 20c of the housing member 20, four strip-shaped support arm sections 21b, 21c, 21d and 21e that have one ends integrally coupled with centers of the respective frame edges of the outer frame section 21a and are capable of twisting, and a movable section 21f located in a center of the spring member 21 and integrally coupled with the other ends of the support arm sections 21b, 21c, 21d and 21e. Thus, the spring member 21 constitutes a four-direction stretching spring in which the movable section 21f is stretched in four directions. The support arm sections 21b and 21d and the support arm sections 21c and 21e are running along the X-axis and the Y-axis perpendicular to each other, respectively. In this embodiment, the movable section 21f is shaped in a circle. However, in modifications, the movable section may be formed in a rectangular shape or other shape.

The permanent magnet 22 used as weight and magnetic field generation is fixed to the center of one surface of the movable section 21f of the spring member 21 so as to face the sensor chips 23 and 24. The magnetic field from the permanent magnet 22 or the bias magnetic field is applied to the spin valve GMR elements 23a and 24a in a direction perpendicular to their lamination plane when no acceleration is applied. In this embodiment, the permanent magnet 22 is formed in a rectangular parallelepiped shape. However, the permanent magnet may be formed in a cylindrical shape or other shape in modifications.

Figure 4:
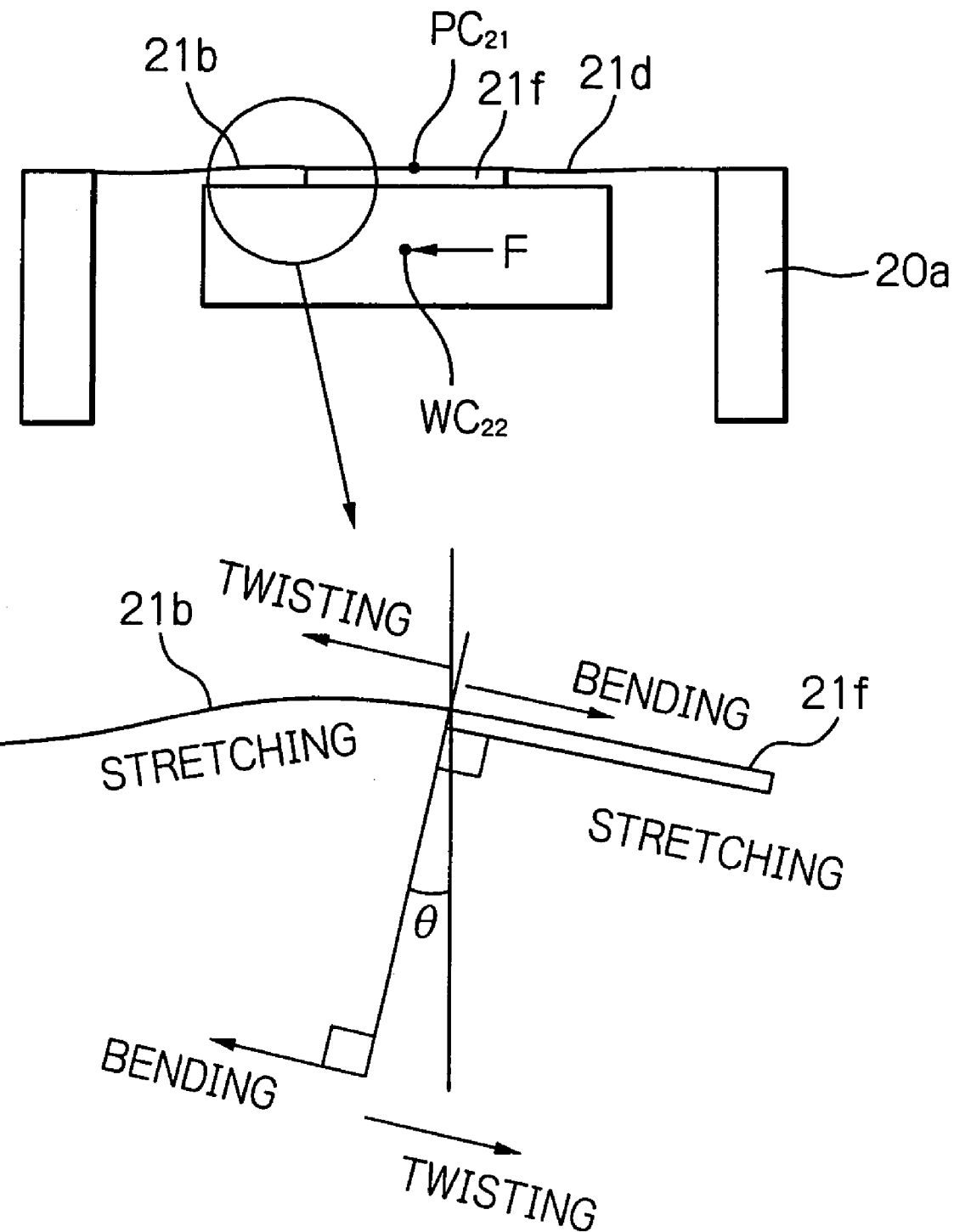
FIG. 4 is a view illustrating operation of the acceleration sensor in the embodiment of FIG. 2.

FIG. 4 illustrates operation of the acceleration sensor in this embodiment. Hereinafter, detection of acceleration in the X-axis direction will be described with reference to this figure.

As shown in FIG. 4, the center of gravity or weight center $WC_{22}$ of the permanent magnet 22 deviates from the pivot center $PC_{21}$ of the spring member 21. Thus, when acceleration F in a lateral direction such as in the X-axis direction is applied, this acceleration F is converted to a moment turning about the support arms 21c and 21e.

This rotation moment and repulsion due to twisting of the support arm sections 21c and 21e and repulsion due to bending and stretching of the support arm sections 21b and 21d are brought into balance. In this case, the repulsion due to twisting is predominant. As a result, the magnet 22 is inclined a small angle θ with respect to the X-axis and therefore the direction of the bias magnetic field changes by the angle θ to the X-axis direction from the perpendicular direction to the lamination plane of the spin valve GMR element.

Because the spin valve GMR element in the sensor chip 23 for detecting acceleration in the X-axis direction is magnetized in the X-axis direction, the GMR element extremely sensitively responds to this change in angle θ and abruptly changes its MR resistance.

Figure 5:
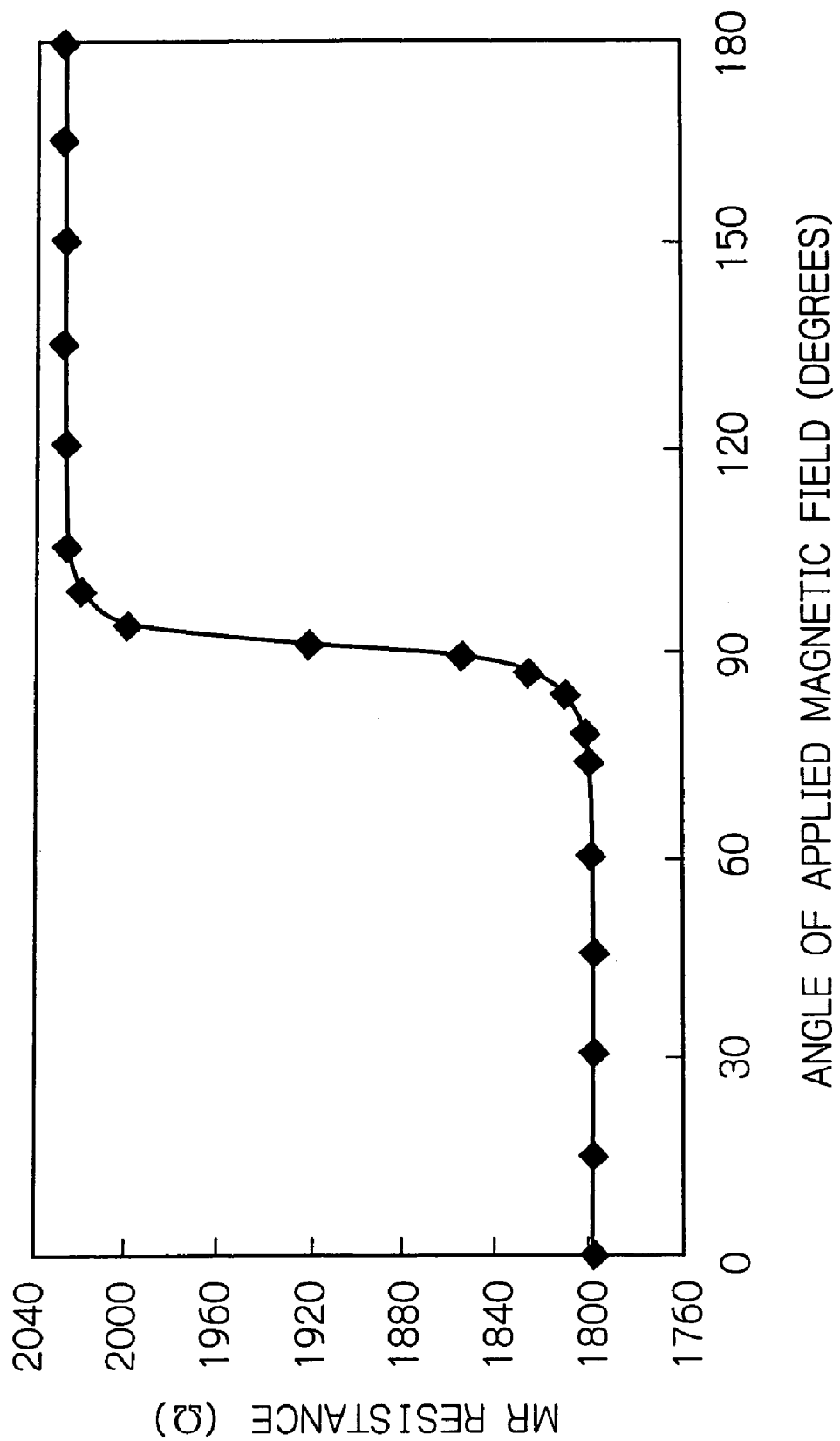
FIG. 5 is a view illustrating characteristics of an MR resistance variation versus an applied magnetic field angle with respect to a lamination plane of a spin valve GMR element.

FIG. 5 illustrates characteristics of the MR resistance variation versus the applied magnetic field angle with respect to the lamination plane of the spin valve GMR element. In the figure, the lateral axis represents an angle (degrees) between the applied magnetic field or the bias magnetic field and the direction along which the free layer runs, that is a direction perpendicular to the magnetization direction, and the longitudinal axis represents an MR resistance (Ω).

As will be noted from the figure, the MR resistance of the spin valve GMR element will greatly change depending upon a slight change near 90 degrees of angle in the bias magnetic field. Because the small angle change θ of the bias magnetic field to the X-axis corresponds to 90 degrees±θ, the small inclination of the permanent magnet 22 is extracted as a change in MR resistance. This change in MR resistance indicates not only the amount of angle change but also positive and negative directions of angle change.

Similar to this, detection of acceleration in the Y-axis direction is performed by the sensor chip 24.

As the magnetization vector is detected, the amount of and the positive and negative of acceleration in each direction to be detected, that is in each of the X-axis and Y-axis directions, can be sensed by each of the sensor chips 23 and 24. Therefore, the number of the magnetic field detection sensor chips can be decreased and also the structure of each sensor chip can be extremely simplified resulting the total size of the acceleration sensor to extremely miniaturize. Furthermore, because the spin valve GMR element is quite sensitive in magnetic field change, highly sensitive acceleration detection can be expected.

According to this embodiment, further, because it is not necessary to form electrodes on the spring member 21 and the permanent magnet 22, the wiring structure can be simplified. Also, since the bias magnetic field is applied to the sensor elements from the permanent magnet 22, this acceleration sensor is insensitive to possible external electrical field and magnetic field applied thereto. In addition, because of a low impedance, the acceleration sensor of this embodiment is relatively unaffected by external disturbance when compared with the piezo-electric type acceleration sensor and the electrostatic capacitance type acceleration sensor.

When a very strong external force is applied to this acceleration sensor, a large stress will be applied to the spring member 21. However, if designed that a space between the spring member 21 and the housing member 20 is narrow as about 0.1 mm for example, this housing member 20 will operate as a limiter to restrict over-stretching of the spring and thus it is possible to prevent cutting or breakage of the spring member.

Although it is merely an example, when forming the spring member 21 by a thin-film plate made of a metal material such as NiFe and Ni, its thickness is about 4 μm, and the width of the support arm sections is about 12 μm. In this case, the inclination θ of the permanent magnet 22 will be within about 0.2–1.0 degrees, and when an acceleration of 1 G is applied, output signal of several mV can be obtained.

Figure 6:
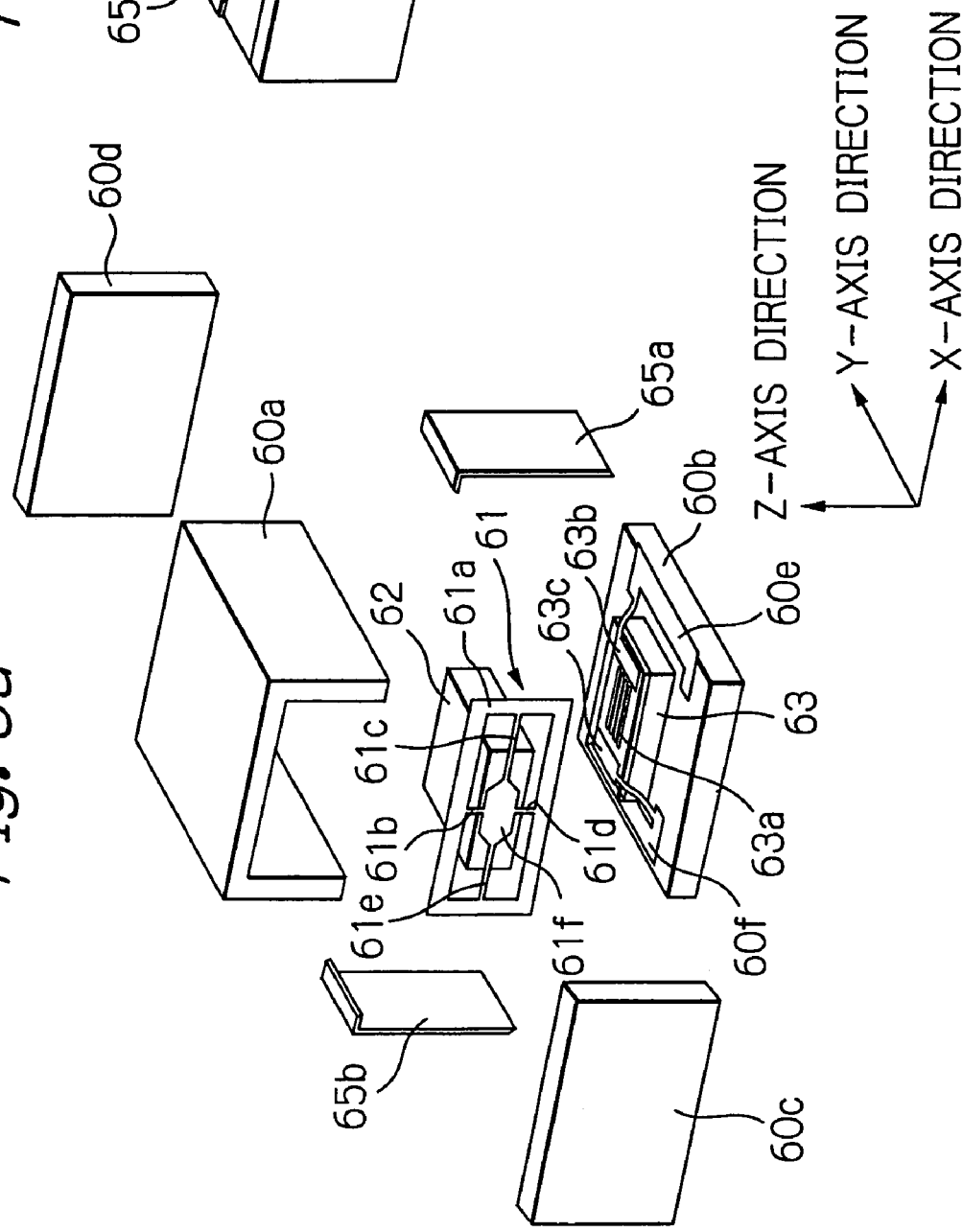
FIGS. 6a and 6b are an exploded oblique view and an oblique view schematically illustrating a whole structure of another embodiment of an acceleration sensor according to the present invention.

FIGS. 6a and 6b schematically illustrate a whole structure of another embodiment of an acceleration sensor according to the present invention.

As shown in FIGS. 6a and 6b, the acceleration sensor in this embodiment is used for detecting acceleration in Z-axis direction and has a spring member 61, a permanent magnet 62 used as a magnetic field source and also as a weight, and a single magnetic field detection sensor chip 63, accommodated in a housing member 60.

The housing member 60 has an upper cover 60a with a U-shaped section, a base 60b with a plane shape and side covers 60c and 60d with a plane shape. A bottom opening of the upper cover 60a is covered by the base 60b and side openings of the upper cover 60a are covered by the side covers 60c and 60d to seal the housing member 60.

The sensor chip 63 for detecting acceleration in the Z-axis direction is mounted on the base 60b. On the base 60b, also, connection pads 60e and 60f wire-bonded respectively to terminal electrodes 63b and 63c of the sensor chip 63.

These connection pads 60e and 60f are electrically connected respectively to external terminals 65a and 65b formed on the outer surfaces of the housing member 60.

In the sensor chip 63 for detecting acceleration in the Z-axis direction, a plurality of spin valve GMR elements 63a are formed in parallel with each other. Each spin valve GMR element 63a has a linear section running along a direction (X-axis direction for example as shown in FIG. 6a) perpendicular to the Z-axis. These spin valve GMR elements 63a are connected in series with each other and both ends of the serially connected elements are electrically connected to the terminal electrodes 63b and 63c, respectively. In a modification, each spin valve GMR element may have a linear section running along the Y-axis direction perpendicular to the Z-axis.

Each spin valve GMR element 63a has a multi-layered structure mainly consisting of a magnetization fixed layer constituted by a pin layer of an anti-ferromagnetic material and a pinned layer of a ferromagnetic material, a nonmagnetic space layer, and a magnetization free layer of a ferromagnetic material. The magnetization of the pinned layer is fixed in a direction perpendicular to a running direction of the free layer. Namely, the magnetization of the sensor chip 63 for detecting acceleration in the Z-axis direction is fixed in the Y-axis direction in this case. In the modification, the magnetization of the sensor chip for detecting acceleration in the Z-axis direction is fixed in the X-axis direction.

In this embodiment, the sensor chip 63 has a plurality of spin valve GMR elements 63a. However, in modifications, the sensor chip may have a single spin valve GMR element. In the latter case, the spin valve GMR element may be formed in a serpentine pattern with a plurality of linear sections running along the X-axis direction.

The spring member 61 is formed from a thin-film magnetic plate made of for example NiFe, Ni or else, from a thin plate made of for example stainless steel, or from a thin resin plate made of for example polyimide, to have a shape shown in FIG. 6a. More concretely, the spring member 61 is formed in a shape with a rectangular outer frame section 61a sandwiched and fixed between the upper cover 60a and the side cover 60c of the housing member 60, four strip-shaped support arm sections 61b, 61c, 61d and 61e that have one ends integrally coupled with centers of the respective frame edges of the outer frame section 61a and are capable of twisting, and a movable section 61f located in a center of the spring member 61 and integrally coupled with the other ends of the support arm sections 61b, 61c, 61d and 61e. Thus, the spring member 61 constitutes a four-direction stretching spring in which the movable section 61f is stretched in four directions. The support arm sections 61b and 61d and the support arm sections 61c and 61e are running along the Z-axis and the X-axis perpendicular to the Z-axis, respectively. In this embodiment, the movable section 61f is shaped in a hexagon. However, in modifications, the movable section may be formed in a circular shape, a rectangular shape or other shape.

The permanent magnet 62 used as weight and magnetic field generation is fixed to the center of one surface of the movable section 61f of the spring member 61 so as to face the sensor chip 63. The magnetic field from the permanent magnet 62 or the bias magnetic field is applied to the spin valve GMR element 63a in a direction perpendicular to the lamination plane when no acceleration is applied. In this embodiment, the permanent magnet 62 is formed in a rectangular parallelepiped shape. However, the permanent magnet may be formed in a cylindrical shape or other shape in modifications.

As well as in the embodiment shown in FIGS. 2a and 2b, the center of gravity or weight center of the permanent magnet 62 deviates from the pivot center of the spring member 61. Thus, when acceleration in the Z-axis direction is applied, this acceleration is converted to a moment turning about the support arms 61c and 61e.

This rotation moment and repulsion due to twisting of the support arm sections 61c and 61e and repulsion due to bending and stretching of the support arm sections 61b and 61d are brought into balance. In this case, the repulsion due to twisting is predominant. As a result, the magnet 62 is inclined a small angle with respect to the Z-axis and therefore the direction of the bias magnetic field changes by this angle to the Y-axis direction from the perpendicular direction to the lamination plane of the spin valve GMR element.

Because the spin valve GMR element in the sensor chip 63 for detecting acceleration in the Z-axis direction is magnetized in the Y-axis direction in this embodiment, the GMR element extremely sensitively responds to this change in angle and abruptly changes its MR resistance.

As mentioned in reference to FIG. 5, the MR resistance of the spin valve GMR element will greatly change depending upon a slight change near 90 degrees of angle in the bias magnetic field. Therefore, the small inclination of the permanent magnet 62 is extracted as a change in MR resistance. This change in MR resistance indicates not only the amount of angle change but also positive and negative directions of angle change.

As a result, the amount of and the positive and negative of acceleration in the Z-axis direction can be detected by this sensor chip 63. Therefore, the number of the magnetic field detection sensor chip can be decreased and also the structure of the sensor chip can be extremely simplified resulting the total size of the acceleration sensor to extremely miniaturize. Furthermore, because the spin valve GMR element is quite sensitive in magnetic field change, highly sensitive acceleration detection can be expected.

According to this embodiment, further, because it is not necessary to form electrodes on the spring member 61 and the permanent magnet 62, the wiring structure can be simplified. Also, since the bias magnetic field is applied to the sensor elements from the permanent magnet 62, this acceleration sensor is insensitive to possible external electrical field and magnetic field applied thereto. In addition, because of a low impedance, the acceleration sensor of this embodiment is relatively unaffected by external disturbance when compared with the piezo-electric type acceleration sensor and the electrostatic capacitance type acceleration sensor.

Figure 7:
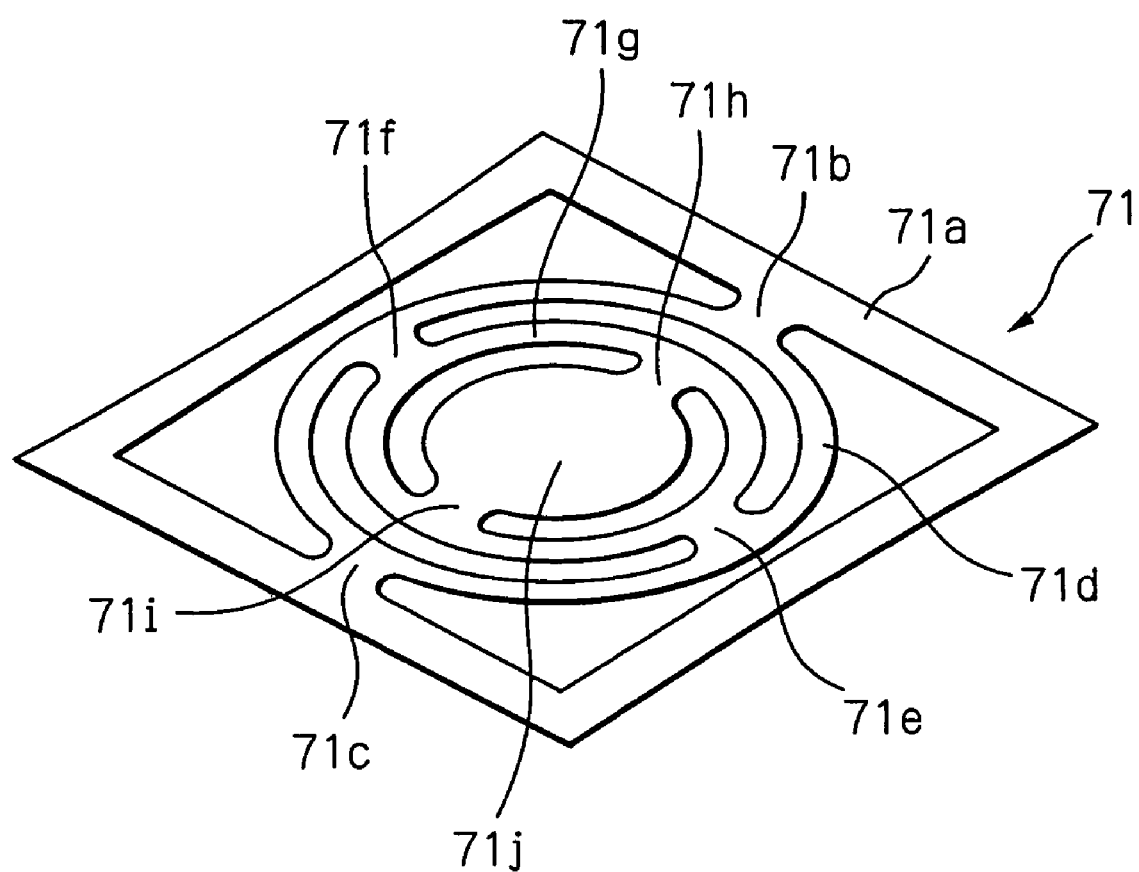
FIG. 7 is an oblique view illustrating a detail structure of a spring member in a modification according to the present invention.

FIG. 7 illustrates a detail structure of a spring member in a modification according to the present invention.

Although various shapes can be adopted as for the spring member of the acceleration sensor according to the present invention, the spring member 71 in this modification is formed in a shape provided with a rectangular outer frame section 71a fixed to the housing member, two first strip-shaped support arm sections 71b and 71c that have one ends integrally coupled with centers of the respective frame edges of the outer frame section 71a and are capable of twisting, a first ring-shaped movable section 71d integrally coupled with the other ends of the first support arm sections 71b and 71c, two second strip-shaped support arm sections 71e and 71f that run along a direction perpendicular to the first support arm sections 71b and 71c, have one ends integrally coupled with the first ring-shaped movable section 71d and are capable of twisting, a second ring-shaped movable section 71g integrally coupled with the other ends of the second support arm sections 71e and 71f, two third strip-shaped support arm sections 71h and 71i that run along a direction perpendicular to the second support arm sections 71e and 71f, have one ends integrally coupled with the second ring-shaped movable section 71g and are capable of twisting, and a circle movable section 71j integrally coupled with the other ends of the third support arm sections 71h and 71i. Thus, the spring member 71 provides function similar to the aforementioned four-direction stretching spring. The first support arm sections 71b and 71d and the third support arm sections 71h and 71i are running along a first direction for example X-axis direction and the second support arm sections 71e and 71f are running along a second direction for example Y-axis (Z-axis) direction perpendicular to the first direction.

In the aforementioned embodiments, used is a single magnetic field detection sensor chip magnetized in a direction of acceleration or acceleration component that is to be detected, for example, in the X-axis direction. In modifications, however, a plurality of magnetic field detection sensor chips magnetized in the same direction may be used. In the latter case, miniaturization in size of the acceleration sensor is somewhat sacrificed. In another modification, two magnetic field detection sensor chips magnetized in the inversed directions and connected in series may be used to obtain a double differential output.

As for the magnetic field detection element, a TMR element may be used instead of the spin valve GMR element.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An acceleration sensor comprising:
   a housing member;
   a spring member attached to said housing member, said spring member having freedom in at least one direction of acceleration to be detected;
   a weight and magnetic field generation member fixed to said spring member; and
   a sole magnetic field detection sensor for each direction of acceleration to be detected, said sole magnetic field detection sensor attached to said housing member to face said weight and magnetic field generation member, said sole magnetic field detection sensor for each direction of acceleration to be detected provided with at least one multi-layered magnetoresistive effect element including a magnetization fixed layer and a magnetization free layer,
   wherein a direction of magnetic field applied to said at least one multi-layered magnetoresistive effect element from said weight and magnetic field generation member being perpendicular to a lamination plane of said at least one multi-layered magnetoresistive effect element when no acceleration is applied, and
   the sole magnetic field detection sensor for each direction of acceleration to be detected includes a plurality of multi-layered magnetoresistive effect elements connected with each other in series.

2. The acceleration sensor as claimed in claim 1, wherein said spring member has freedom in rotation around at least two axes.

3. The acceleration sensor as claimed in claim 2, wherein said spring member includes at least two support arm sections capable of twisting and a movable section supported by said at least two support arm sections, said weight and magnetic field generation member being fixed to said movable section.

4. The acceleration sensor as claimed in claim 3, wherein said at least two support arm sections of said spring member includes two support arms running along one axis, and one end of each of said two support arms is fixed to said housing member and a second end of each of said two support arms is coupled to said movable section.

5. The acceleration sensor as claimed in claim 3, wherein said at least two support arm sections of said spring member includes four support arms running along two axes perpendicular to each other, and one end of each of said four support arms is fixed to said housing member and a second end of each of said four support arms is coupled to said movable section.

6. The acceleration sensor as claimed in claim 1, wherein said spring member is arranged in parallel to the lamination plane of said at least one multi-layered magnetoresistive effect element.

7. The acceleration sensor as claimed in claim 1, wherein said spring member is arranged perpendicular to the lamination plane of said at least one multi-layered magnetoresistive effect element.

8. The acceleration sensor as claimed in claim 1, wherein said weight and magnetic field generation member is fixed to one surface of said spring member so as to convert acceleration applied thereto into a rotational moment.

9. The acceleration sensor as claimed in claim 1, wherein said weight and magnetic field generation member is a permanent magnet.

10. The acceleration sensor as claimed in claim 1, wherein the sole magnetic field detection sensor for each direction of acceleration to be detected includes at least one multi-layered magnetoresistive effect element magnetized in a direction parallel to the direction of acceleration to be detected.

11. The acceleration sensor as claimed in claim 10, wherein the sole magnetic field detection sensor for each direction of acceleration to be detected includes two multi-layered magnetoresisitive effect elements, and the two multi-layered magnetoresistive effect elements are magnetized in opposite directions parallel to the direction of acceleration to be detected.

12. The acceleration sensor as claimed in claim 10, wherein a first and second direction of acceleration are detected, the acceleration sensor further comprising:
    a first sole magnetic field detection sensor for the first direction of acceleration to be detected and a second sole magnetic field detection sensor for the second direction of acceleration to be detected,
    wherein multi-layered magnetoresistive effect elements in said first and second sole magnetic field detection sensors are magnetized in two directions perpendicular to each other, respectively.

13. The acceleration sensor as claimed in claim 1, wherein the plurality of multi-layered magnetoresistive effect elements each have a linear section running along a direction perpendicular to a magnetization direction in said lamination plane.

14. The acceleration sensor as claimed in claim 1, wherein the at least one multi-layered magnetoresistive effect element is a giant magnetoresistive effect element.

15. A magnetic disk drive apparatus comprising:
    at least one magnetic disk, at least one magnetic head faced to a surface of said at least one magnetic disk in operation, and an acceleration sensor, said acceleration sensor including
    a housing member;
    a spring member attached to said housing member, said spring member having freedom in at least one direction of acceleration to be detected;
    a weight and magnetic field generation member fixed to said spring member; and
    a sole magnetic field detection sensor for each direction of acceleration to be detected attached to said housing member to face said weight and magnetic field generation member, said sole magnetic field detection sensor for each direction of acceleration to be detected provided with at least one multi-layered magnetoresistive effect element including a magnetization fixed layer and a magnetization free layer,
    wherein a direction of magnetic field applied to said at least one multi-layered magnetoresistive effect element from said weight and magnetic field generation member being perpendicular to a lamination plane of said at least one multi-layered magnetoresistive effect element when no acceleration is applied, and
    the sole magnetic field detection sensor for each direction of acceleration to be detected includes a plurality of multi-layered magnetoresistive effect elements connected with each other in series.

16. The magnetic disk drive apparatus as claimed in claim 15, wherein
    said spring member includes four support arm sections capable of twisting and a movable section supported by said four support arm sections, said weight and magnetic field generation member being fixed to said movable section, and
    said four support arm sections run along two axes perpendicular to each other, one ends of said four support arm sections being fixed to said housing member and the other ends of said four support arm sections being coupled to said movable section.

17. The magnetic disk drive apparatus as claimed in claim 15, wherein said plurality of multi-layered magnetoresistive effect elements are magnetized in a direction parallel to the direction of acceleration to be detected.

* * * * *